(12) United States Patent
Curtis

(10) Patent No.: US 6,615,278 B1
(45) Date of Patent: Sep. 2, 2003

(54) CROSS-PLATFORM PROGRAM, SYSTEM, AND METHOD HAVING A GLOBAL REGISTRY OBJECT FOR MAPPING REGISTRY EQUIVALENT FUNCTIONS IN AN OS/2 OPERATING SYSTEM ENVIRONMENT

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,350

(22) Filed: Mar. 29, 1999

(51) Int. Cl.$^7$ .............................. G06F 9/00; G06F 9/46
(52) U.S. Cl. ...................... 709/310; 709/315; 709/329
(58) Field of Search ................................ 709/310, 329, 709/315

(56) References Cited

U.S. PATENT DOCUMENTS

| 5,790,809 A | | 8/1998 | Holmes | |
|---|---|---|---|---|
| 5,822,580 A | * | 10/1998 | Leung | 707/10 |
| 5,903,753 A | | 5/1999 | Bramnick et al. | |
| 5,966,540 A | * | 10/1999 | Lister et al. | 717/118 |
| 6,189,147 B1 | * | 2/2001 | Davis | 707/202 |

OTHER PUBLICATIONS

Setup Factory 4.0, "User's Guide", Mar. 1998, Winnipeg Canada, IndigoRose software Design Corp., pp. 1–84.
eMEDIALIVE: eMEDIA New Products, EMedia Professional, Feb. 1998. http://www.emedialive.com/EM1998/products2.html.
AT9–98–853, Global Registry Object for Mapping Registry Functions and Registry Equivalent Function Across Multiple Operating Systems in a Cross–Platform Program, S/N 09/280,371, filing date Mar. 29, 1999.
AT9–98–866, A System, Method, and Program for Updating Registry Objects with a Cross–Platform Installation Program, S/N 09/280,351, filing date Mar. 29, 1999.
AT9–98–863, A System, Method, and Program for Providing an Object–Oriented Install Architecture, S/N 09/280,352, filing date Mar. 29, 1999.
AT9–98–861, A Cross–Platform Program, System, and Method Having a System Independent Registry for Use on Operating Systems Irrespective of a Registry Equivalent, S/N 09/280,368, filing date Mar. 29, 1999.
AT9–98–869, A Cross–Platform Program, System, and Method Having a Global Registry Object for Mapping Registry Equivalent Functions in an AIX Operating System Environment, S/N 09/280,345, filing date Mar. 29, 1999.
AT9–98–851, A Cross–Platform Program, System, and Method Having a Global Registry Object for Mapping Registry Functions in a Windows Operating System Environment, S/N 09/280,349, filing date Mar. 29, 1999.

* cited by examiner

Primary Examiner—Sue Lao
Assistant Examiner—LeChi Truong
(74) Attorney, Agent, or Firm—Marilyn Smith Dawkins

(57) ABSTRACT

The system, method, and program of this invention enables a developer to write a platform independent program that can read, create, modify, delete, and enumerate registry type of information regardless of whether or not a targeted operating system supports a registry or registry equivalent functionality. More specifically, as disclosed herein, there is a global registry object for carrying out, i.e., mapping, registry functions or registry equivalent functions across multiple operating systems. In particular, the global registry object is used to map registry equivalent functions in an OS/2 operating system environment. A given INI file is specified through a filename field of the global registry object to resemble a registry file. A key and a subkey representative of a Windows registry are stored in an application name of the specified INI file. A value representative of the Windows registry is stored in a key of the specified INI file. Platform specific code specific to the OS/2 operating system contains methods for retrieving the application name and the key from the INI file for use by the global registry object.

5 Claims, 4 Drawing Sheets

CROSS-PLATFORM PROGRAM, SYSTEM, AND METHOD HAVING A GLOBAL REGISTRY OBJECT FOR MAPPING REGISTRY EQUIVALENT FUNCTIONS IN AN OS/2 OPERATING SYSTEM ENVIRONMENT

CROSS-REFERENCE TO RELATED APPLICATIONS

The present application is related to the following applications:

application Ser. No. 09/280,345 filling date Mar. 9, 1999, entitled "A CROSS-PLATFORM PROGRAM, SYSTEM, AND METHOD HAVING A GLOBAL REGISTRY OBJECT FOR MAPPING REGISTRY EQUIVALENT FUNCTIONS IN AN AIX OPERATING SYSTEM ENVIRONMENT";

application Ser. No. 09/280,349 U.S. Pat. No. 6,332,219, entitled "A CROSS-PLATFORM PROGRAM, SYSTEM, AND METHOD HAVING A GLOBAL REGISTRY OBJECT FOR MAPPING REGISTRY FUNCTIONS IN A WINDOWS OPERATING SYSTEM ENVIRONMENT";

application Ser. No. 09/280,371 U.S. Pat. No. 6,446, 255, entitled "GLOBAL REGISTRY OBJECT FOR MAPPING REGISTRY FUNCTIONS AND REGISTRY EQUIVALENT FUNCTIONS ACROSS MULTIPLE OPERATING SYSTEMS IN A CROSS-PLATFORM PROGRAM";

application Ser. No. 09/280,368 U.S Pat. No. 6,536,040, entitled "A CROSS-PLATFORM PROGRAM, SYSTEM, AND METHOD HAVING A SYSTEM INDEPENDENT REGISTRY FOR USE ON OPERATING SYSTEMS IRRESPECTIVE OF A REGISTRY EQUIVALENT";

application Ser. No. 09/280,344 U.S Pat. No. 6,269.480, entitled "A SYSTEM, METHOD, AND PROGRAM FOR ENABLING A USE OF PROPERTY OBJECT HAVING A VARIABLE FOR A PROPERTY VALUE IN A CROSS-PLATFORM PROGRAM";

application Ser. No. 09/280,346 filling date Mar. 9, 1999, entitled "A SYSTEM, METHOD, AND PROGRAM FOR OVERRIDING PROGRAM PROPERTIES";

application Ser. No. 09/280,352 U.S Pat. No. 6,347,397, entitled "A SYSTEM, METHOD, AND PROGRAM FOR PROVIDING AN OBJECT-ORIENTED INSTALL ARCHITECTURE";

application Ser. No. 09/280,375 U.S. Pat. No. 6,397,355, entitled "A SYSTEM, METHOD, AND PROGRAM FOR AUTOMATIC ERROR DETECTION WHILE UTILIZING A SOFTWARE STATE MACHINE FOR CARRYING OUT THE PROCESS FLOW OF A SOFTWARE PROGRAM";

application Ser. No. 09/280,376 filling date Mar. 29, 1999, entitled "A SYSTEM, METHOD, AND PROGRAM FOR UTILIZING A SOFTWARE STATE MACHINE FOR CARRYING OUT THE PROCESS FLOW OF A SOFTWARE PROGRAM";

application Ser. No. 09/280,369 filling date Mar. 29, 1999, entitled "A SYSTEM METHOD, AND PROGRAM FOR ENABLING A SOFTWARE PROGRAM TO AUTOMATICALLY SELECT A SYSTEM-DEPENDENT FUNCTION";

application Ser. No. 09/280,372 filling date Mar. 29, 1999, entitled "A SYSTEM, METHOD, AND PROGRAM FOR MAPPING A GLOBAL OBJECT TO DESKTOP ELEMENTS OF DIFFERENT OPERATING SYSTEMS";

application Ser. No. 09/280,370 U.S. Pat. No. 6,442,754, entitled "A SYSTEM, METHOD, AND PROGRAM FOR PROCESSING DEPENDENCIES USING A DEPENDENCY OBJECT";

application Ser. No. 09/280,348 filling date Mar. 29 1999, entitled "A SYSTEM, METHOD, AND PROGRAM FOR MODIFYING A TEXT FILE";

application Ser. No. 09/280,351 U.S. Pat. No. 6,374,401, entitled "A SYSTEM, METHOD, AND PROGRAM FOR UPDATING REGISTRY OBJECTS WITH A CROSS-PLATFORM INSTALLATION PROGRAM";

application Ser. No. 09/280,374 U.S. Pat. No. 6,360,365, entitled "A SYSTEM, METHOD, AND PROGRAM FOR PRESERVING BACKGROUND SETTINGS DURING INSTALL AND UNINSTALL OPERATIONS";

application Ser. No. 09/280,347 filling date Mar. 29, 1999, entitled "A SYSTEM, METHOD, AND PROGRAM FOR MODIFYING A LIBRARY OBJECT";

application Ser. No. 09/280,353 filling date Mar. 29, 1999, entitled "A SYSTEM, METHOD, AND PROGRAM FOR INSTALLATION ON DRIVES USING A DRIVE OBJECT"; and application Ser. No. 09/280,373 filling date Mar. 29, 1999, entitled "A SYSTEM, METHOD, AND PROGRAM FOR PERFORMING PROGRAM SPECIFIC OPERATIONS DURING THE UNINSTALLATION OF A COMPUTER PROGRAM FROM A COMPUTER SYSTEM".

The above are all filed on the same day as the present application, assigned to the assignee of the present application, and incorporated by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to techniques for enabling a computer program to be platform independent, and more specifically, to the use of global objects for mapping registry functionality amongst the different operating systems.

2. Background and Related Art

An installer program is a software program that enables a programmer to write specific code that will allow a user to install a given application program onto the drives of a computer in a way that enables the given application program to work correctly with the computer's environment including its operating system. There are several types of installers—Java installers and operating system specific installers, e.g., Windows installers, OS/2 installers and AIX installers, etc. Many of these install programs existing today have various limitations in their functionality as discussed below.

One type of Java installer is provided by a software company known as InstallShield. Currently, this Java installer has some limitations on certain functional features. For example, the Java installer provides default panels, but the text can't be changed or configured. Also, this Java installer is not easy to customize. In other words, a programmer cannot easily add a function to the installer program that it doesn't already do. In addition, the Java installer does not provide very much registry support. A registry is a central repository for all possible information for the computer such as hardware configurations and software settings, etc. The registry enables a user/programmer to keep information about the software product. It enables a user to find out information about other products, based upon what the user/programmer put into the registry or what the user is looking for. Presently, the Java installer only works with a Windows' registry; and the support provided here is limited. For example, it does not enable the system Windows' registry to be updated directly. Instead, the keys to be updated are in a file which must be imported into the registry through a system call. It would be desirable if such a Java installer program supported multiple directories, splash screens (which are images that come up while a software product is being installed), and multiple languages instead of just English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as OS/2 or AIX.

Another Java installer is called "Install Anywhere" from ZeroG. This Java installer program also has a default panel that cannot be changed, i.e., it is not customizable in terms of the order in which the panels are to appear. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Windows' 32 installer. Although this installer program is widely used throughout the industry, it is based upon a proprietary scripting language that InstallShield defined. The scripting language is similar to Basic programming language. Nevertheless, a user/programmer must learn the scripting language to be able to write an install program, and it is not a real easy language to write in. When creating install programs using the Windows' 32 installer, a programmer must first learn the new language. Even then, it is difficult to write complicated install scripts with this scripting language.

For the OS/2 operating system, there is not a true architected way within the operating system itself to install. Two programs have existed for writing install code on OS/2. One of them is "Feature Installer", which has a tendency to be difficult to use. Also, it is hard to figure out how to write an install program from it. For example, it is tied into the workplace shell which requires special knowledge of SOM programming. Also, there is no compression of files. The second program is "Software Installer", which was the precursor to "Feature Installer", and is no longer supported as a product.

Also, for the OS/2 operating system, since OS/2 has Java on it, a programmer could use InstallShields' Java edition to write install code to install some types of programs. However, this does not provide much function other than just copying files.

Other than using Feature Installer, Software Installer, or a Java Installer, programmers must come up with their own way to write install code for an application program on an OS/2 machine.

Since the OS/2 operating system appears to have been architected without regard to install features, the above discussed ways for installing OS/2 application programs have no way to talk to each other. They will each have a different way of keeping track of things. As such, there is no one place to go to find out what has been installed on an OS/2 machine or to check dependencies to see what has been installed already.

For the AIX operating system, the command "installp" is used to install products. It is platform specific. It is also command line driven which is typical for the AIX operating system Nevertheless, it appears to work well and is widely used.

As shown above, installers are tailored for a specific operating environment, e.g., JAVA, and/or operating system. As such, programmers using an installer to write install code must know and understand the specific operating environment and/or system quite well. This creates an added burden for a software company that produces many different application programs, with each application program available on many different operating systems. Separate install code must be written for each application for each different operating system. This requires a matrix of expertise—expertise in a given application, and expertise in a given operating system environment. This requires either a widely knowledgeable expert who is burdened with writing various specific versions of install code, or many different expert programmers who are essentially assigned the same task of writing install code.

Without such expertise, small software products just do not get install programs written for them for various platforms. In addition, money, resources, and time could be saved by writing an installer program only once that is applicable across all operating systems and environments.

It would also be desirable for a software manufacturer to have a common look and feel for writing install code for all of its products. In this way, as a programmer moved from platform to platform in writing install code, the programmer would recognize the interface, and know how it works. Thereby making the programmers task much easier.

Also, as shown above, there presently does not exist a functionally rich installer for Java. It is desirable to have a Java installer that is at least as functionally rich as a Window's installer.

SUMMARY OF THE INVENTION

It is therefore an object of this invention to provide a cross-platform installer that can be used to install products across multiple operating systems.

It is a further object of this invention to provide a tool kit that will enable a programmer knowledgeable in writing install programs to be able to automatically write an install program that is applicable across other operating systems and environments without having to be an expert in each of the operating systems and environments.

It is a further object of this invention to provide a common look and feel for writing install code for all products.

It is a further object of this invention to provide a full function installer.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, and AS/400.

In the preferred embodiment of this invention, the functions provided by the installer tool kit are script based (Java). This enables the developer who is writing an installer to do whatever the developer wants to do. The developer is not limited in having panels occur in a particular order, or in not being able to make the calls that need to be made, or in not being able to perform a desired function such as configuring files, etc. To accomplish this, the tool kit was written using Java, although any script-based language would provide this same flexibility. As such, anything that Java has available in it is available to the developer. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting, or changing the various states that contain the functions and flow of control of the program; iv) automatically detecting a programming error if a programmer incorrectly specifies a non-existent state within the state machine; v) automatically selecting a system-dependent function; vi) a containment structure consisting of program object/fileset objects/install objects where each fileset object and install object contains means to install and uninstall itself and to log itself; vii) enabling the management of folders, shortcuts and icons, viii) enabling environment variables to be read, created, modified and deleted, ix) providing dependency checking of prerequisite programs during both install and uninstall, and x) providing various logs, e.g., a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source directories. For example, there can be multiple components of file sets included in an install where a file set is a separately installable/uninstallable piece of code or set of files.

The tool kit also enables an install program to undo an install. What has been changed during an install is kept track of. If, for example, an install is over the top of a previous install, the changes are saved in a file and restored if the latest install is then uninstalled. In other words, a previous version is recovered when a latest version is uninstalled by replacing a backup of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

The system, method, and program of this invention enables a developer to write a platform independent program that can read, create, modify, delete, and enumerate registry type of information regardless of whether or not a targeted operating system supports a registry or registry equivalent functionality. More specifically, as disclosed herein, there is a global registry object for carrying out, i.e., mapping, registry functions or registry equivalent functions across multiple operating systems. In particular, the global registry object is used to map registry equivalent functions in an OS/2 operating system environment. A given INI file is specified through a filename field of the global registry object to resemble a registry file. A key and a subkey representative of a Windows registry are stored in an application name of the specified INI file. A value representative of the Windows registry is stored in a key of the specified INI file. Platform specific code specific to the OS/2 operating system contains methods for retrieving the application name and the key from the INI file for use by the global registry object.

In other preferred embodiments, the global registry object is used to manipulate registry functions in a Windows operating system environment, and to map registry equivalent functions in an AIX operating system environment In another preferred embodiment, a system independent registry is created for those systems that do not have a registry equivalent.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

DETAILED DESCRIPTION

The following description and the accompanying drawings illustrate a preferred embodiment of the present invention. It is understood that other embodiments may be utilized, and structural and operational changes may be made, without departing from the scope and spirit of the present invention.

Figure 1:
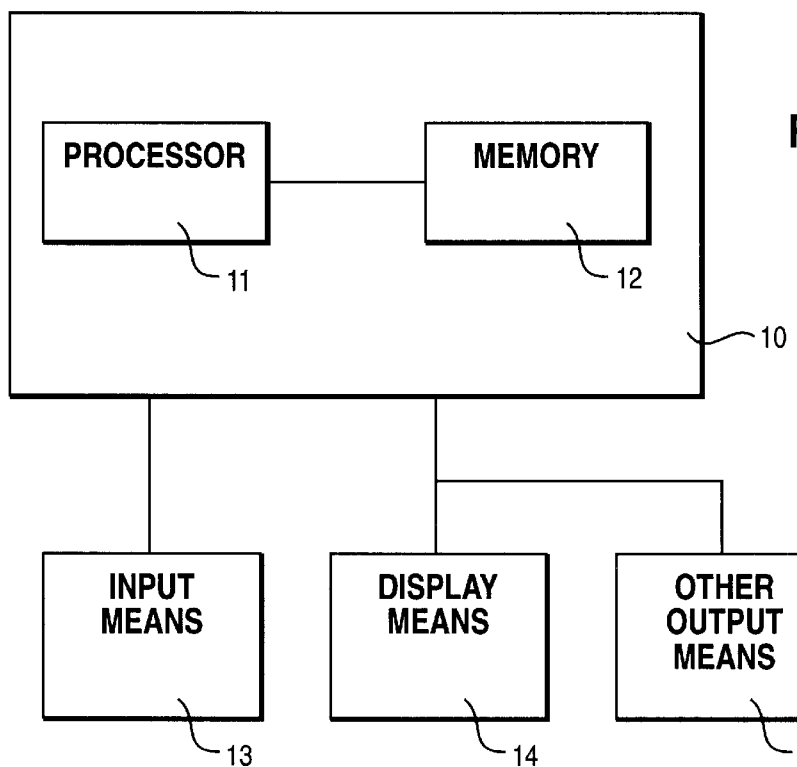
FIG. 1 depicts a block diagram of a data processing system in which a preferred embodiment of the present invention may be implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc.. Nonvolatile memory may include storage space, e.g., via the use of hard disk drives, for programs, whether or not the programs are being executed. The programs in memory 12 include an operating system program and application programs, such as an install program or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
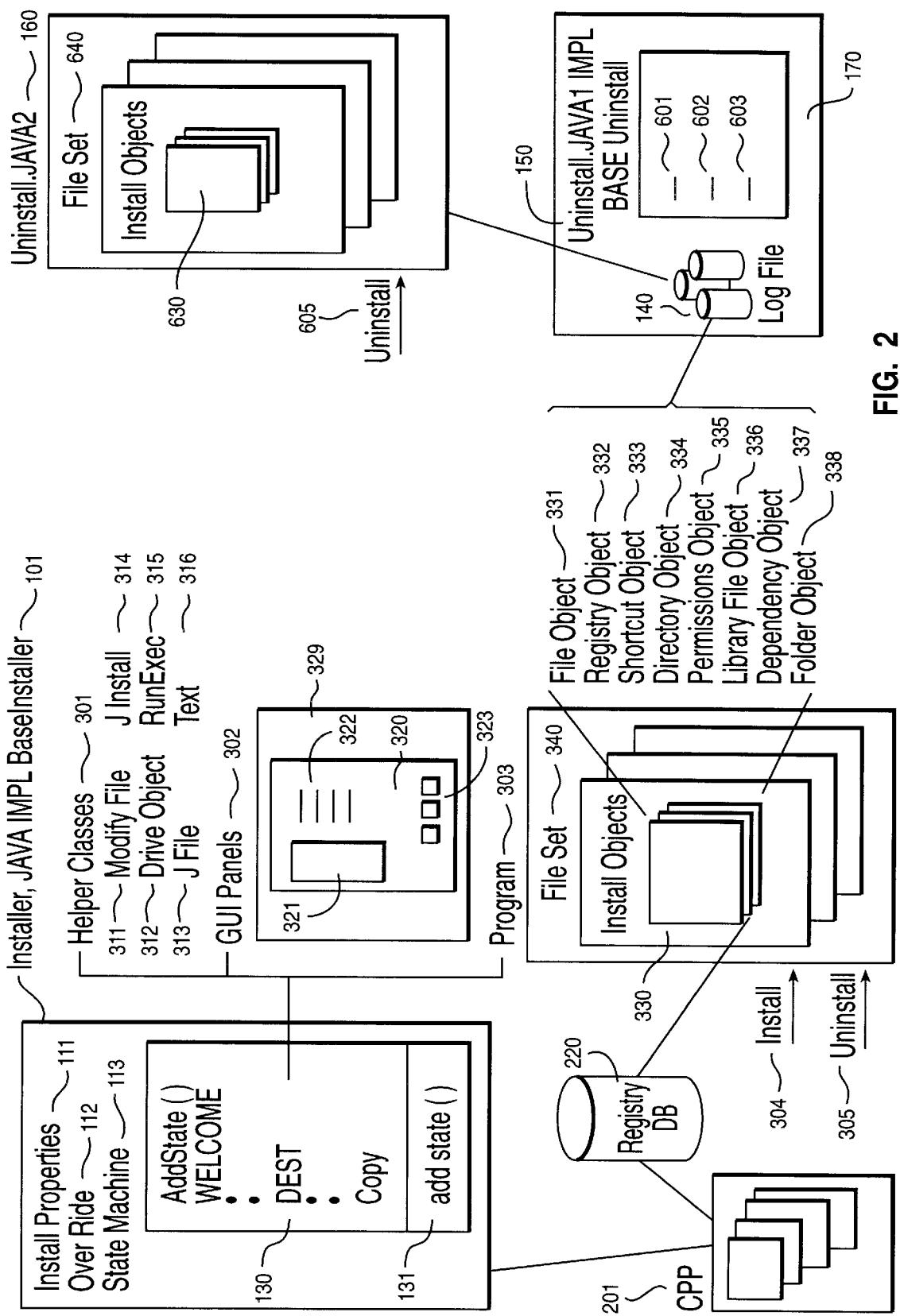
FIG. 2 depicts the flow and structural components of a cross-platform installer program.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enables access to environment variables and enables other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

Within any given state there is also the heart of the install program, which is a program object 303 having file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that asks where the product is to be installed. The install properties 111 may be used in the destination state by having a destination panel set a particular destination directory name of an install property to a particular directory. During the copy state, the program object 303 is built up with all of the install objects 330 in them. The install command 304 is then called on the program object. Each one of the file sets 340 and install objects 330 contains an install method. As such, by calling install 304 on the parent object, i.e., the program object 303, the program object goes through and calls install on all of the other objects 340, 330 that it contains.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 gets written out to a log file 140 which is put into a particular directory. At the same time that the install objects 330 log themselves to the log file, there is also another file, called "uninstall.Java1" 150 which implements a "base uninstall" class. It has several methods in it that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330. "Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603, as discussed below. This allows certain things to happen when the file set is being uninstalled.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, ... 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The above description presented an overview of the install program and how it works. The following describes, in more detail, various parts of the overall structure and process described above.

Figure 3:
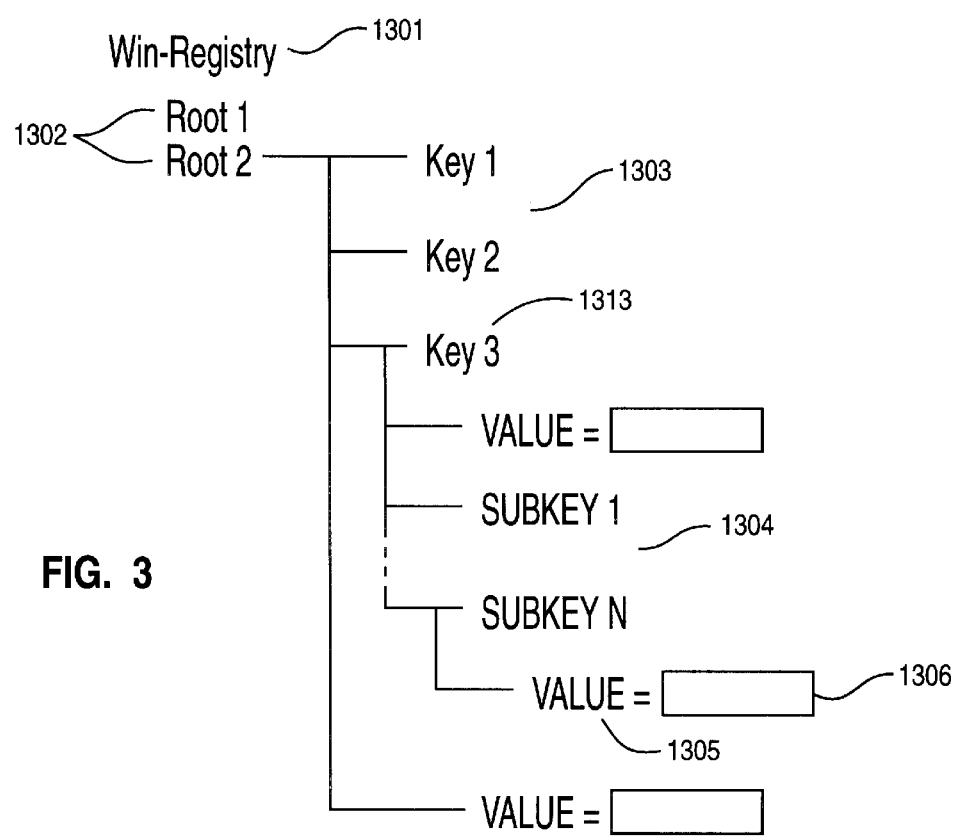
FIG. 3 illustrates a Windows registry.

For the Windows operating system there is an entity known as a registry. The registry is a file that has several API's to it, e.g., the Windows 32 registry APIs. With reference to FIG. 3, a registry 1301 is set up such that it has several roots 1302. Underneath each root there can be a plurality of keys 1303, i.e., as many keys as needed. Underneath each key 1303 there can be a plurality of subkeys 1304. At the end of these subkeys, there is a value 1305 and something that the value equals 1306. There can be values underneath any of the keys. For example, under key 3 there can be a subkey and also a value. This is similar to a directory structure where the values equate to the filenames; and the contents of the file is what the value equals. The above describes the way in which the Windows registry is set up.

Figure 4:
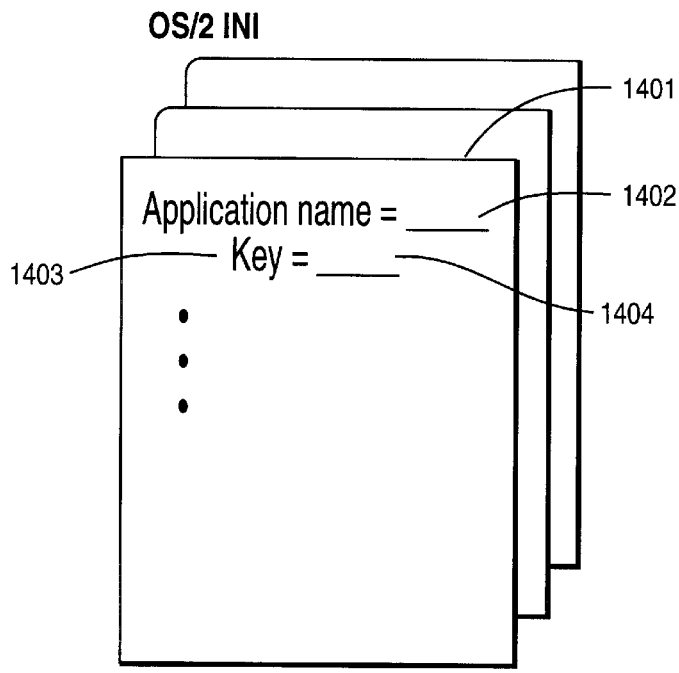
FIG. 4 illustrates the structure of INI files in the OS/2 operating system.

With reference to FIG. 4, the OS/2 operating system does not have a registry. Instead, the OS/2 operating system has binary INI files 1401, and there can be many of these INI files. An INI file has an application name 1402; and under the application name, there can be a key 1403 that equals some value 1404. The application name 1402 and key and value combination 1403, 1404 can be repeated 1405. However, there is no nesting, i.e., the INI files are just one level deep. There can be many INI files, though With reference to FIG. 5, the AIX operating system has a plurality of ODM files i500. Each ODM file can have a plurality of keys. The keys are grouped together and can repeat. For example, key 1 equals some value 1501, key 2 equals some value 1502, and key 3 equals some value 1503. Each group of keys 1501, 1502, 1503 is one entry. The keys can then repeat, 1511, 1512, 1513 which is similar to a record in a database that repeats.

Figure 6:
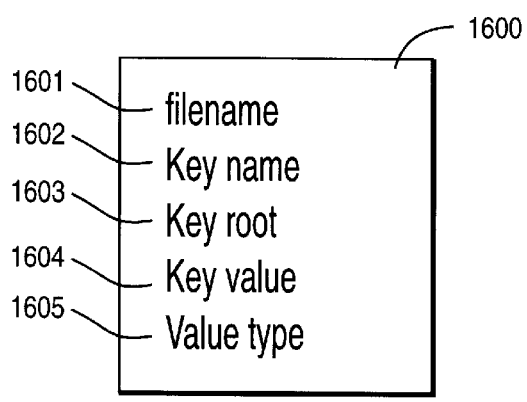
FIG. 6 illustrates a structure of a Global registry object.

In a preferred embodiment of the invention, a global registry object 1600, FIG. 6, represents the registry of the Windows operating system and the equivalent functionality in other operating systems such as OS/2 and AIX. The global registry combines the registry and equivalent registry functionality in the different operating systems and performs the mapping for the different operating systems. The preferred embodiment defines the structure of the global registry object. The global registry object has a filename 1601, key name 1602, key root 1603, key value 1604, and value type 1605. These fields are used to to map the global registry object to the various operating systems.

Class RegistryObject public class RegistryObject extends Object implements InstallObject This RegistryObject class encapsulates a registry equivalent for the different operating systems. For Win 32, it maps to the windows registry. For OS/2, it maps to binary INI files.

An example of the usage is:

RegistryObject r=new RegistryObject ( );

r.setKeyRoot(CPPWIN32.HKEY_LOCAL_ MACHINE);

r.setKeyName("Software\\Netscape\\Netscape Navigator\\4.03 (en)\\Main\\Java Directory");

System.out.println("Registry value of"+r.getKeyName( )+"="+r.getValue( );

METHOD INDEX delete( )
    Delete a registry key or key value doUninstall(boolean)
    Find out if this object will be uninstalled given the removeAll value.

enumerate( )
    Enumerate registry key getComment( )
    Get the comment to be displayed during installation of this object getFile( )
    Get the file name of the registry for the default OS.

getFile(String)
    Get the file name of the registry for a particular OS.

getInputStream( )
    Get the input stream from which this object can be read.

getKeyName( )
    Get the registry key name the default OS.

getKeyName(String)
　Get the registry key name for a particular OS.
getKeyNameName( )
　Get the registry key name the default OS.
getKeyNameName(String)
　Get the registry key name name for a particular OS.
getKeyPath( )
　Get the registry key name path the default OS.
getKeyPath(String)
　Get the registry key name path for a particular OS.
getKeyRoot( )
　Get the key root of this registry for the default OS.
getKeyRoot(String)
　Get the key root of this registry for a particular OS.
getKeyValue( )
　Get the registry key value for the default OS.
getKeyValue(String)
　Get the registry key value for a particular OS.
getLogOutputStream( )
　Get the log file to use to log this object
getSize( )
　Get the amount of disk space this object uses.
getType( )
　Get the type of result this registry is (String or Int).
getValue( )
　Get the value of a registry key
install(FileSet)
　Set the value of a registry key Note: If the key does not already exist, a new one is created
readFromLog( )
　Read this object from the install log and initialize the variables
readFromLog(RandomAccessFile)
　Read this object from the install log and initialize the variables
setComment(String)
　Set the comment to be displayed during installation of this object
setFile(String)
　Set the file name of the registry for the default OS.
setFile(String, String)
　Set the file name of the registry for a particular OS.
setInputStream(InputStream)
　Set the input stream from which this object can be read.
setKeyName(String)
　Set the default registry key name for all OS.
setKeyName(String, String)
　Set the registry key name for a particular OS.
setKeyRoot(int)
　Set the key root of this registry for the default OS.
setKeyRoot(String, int)
　Set the key root of this registry for a particular OS.
setKeyValue(Object)
　Set the registry key value for the default OS.
setKeyValue(String, Object)
　Set the registry key value for a particular OS.
setLogOutputStream(RandomAccessFile)
　Set the log file to use to log this object
setSize(long)
　Set the amount of disk space this object uses.
setTypeInt( )
　Set the type of result this registry is (Int).
setTypeString( )
　Set the type of result this registry is (String=Default).
setValue( )
　Set the value of a registry key Note: If the key does not already exist, a new one is created
toString( )
　convert this object into a string
uninstall(FileSet)
　Unconditionally uninstall this object.
uninstall(FileSet, boolean)
　Uninstall this object.
writeToLog( )
　Save this object to the install log specified in setLogOutputStream.
writeToLog(RandomAccessFile)
　Save this object to the install log specified by log.

Figure 7:
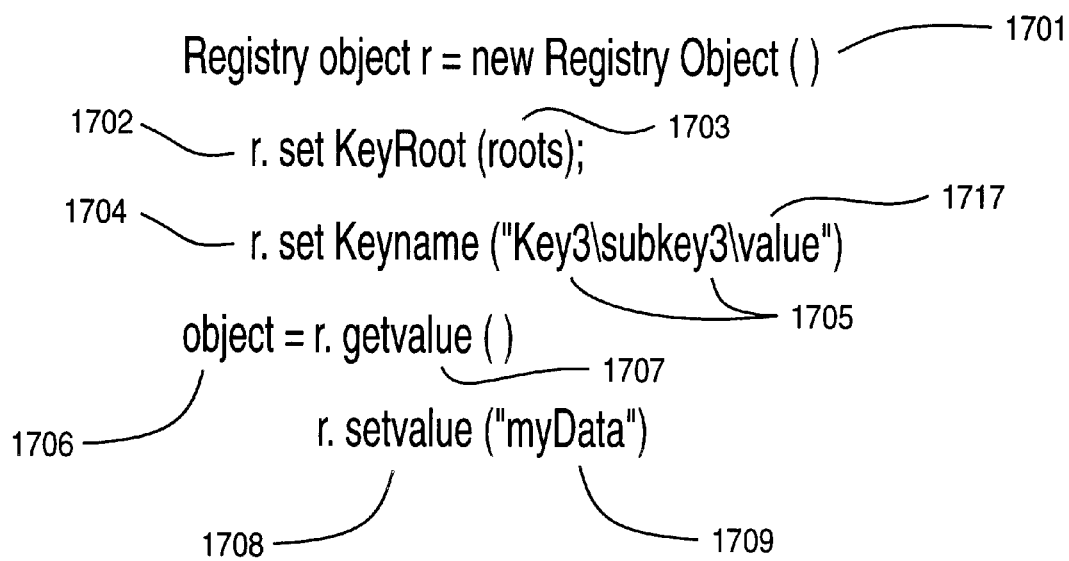
FIG. 7 illustrates a creation of a new global registry object.

For example, the way this is used is shown in FIG. 7. A new registry object is created 1701. The registry object can have various methods such as "set key root" which sets variable 1603, FIG. 6. Key root 1603 corresponds in Windows to one of the items 1302, FIG. 3. In Windows, there are constants 1703 that represent these particular predefined roots 1302. There is a method called "set key name" 1704 which would be used to set one of the keys 1303 and values 1306 that the user will be working with. Parameter 1705 specifies root 2, key 3, subkey 3, value (FIG. 3) to represent "mykeyname" which is similar to specifying a file in a file system. A "get value" method 1707 returns an object 1706 that represents what the value 1306 (FIG. 3) was set to. That value is not necessarily a string, it can also be binary data. The value type 1605 (FIG. 6) is used to indicate what type of data is expected, i.e., whether it is string data or binary. To set that value, a "setValue" method 1708 is used to set the value 1306 (FIG. 3) to "myData" 1709, and to save it in the registry.

There are more Windows API calls than methods shown in FIG. 7. The methods shown in FIG. 7 are mapped to more than one call. The methods reflect logical groupings of the API functions, and not necessarily each specific API that has been provided. The above has described the simplification and improvement of manipulating the registry for Windows by using the global registry object of the preferred embodiment of this invention.

---

Registry tor Win32
---- from CPPWIN32.java
　　/\*\*
　　　\* Get the value of a registry key
　　　\*
　　　\* @ param reg the registry object
　　　\* @ return object containing the value of the registry key or null
　　　\* if key is not found

```
*/
public Object getRegKeyValue(RegistryObject reg) {
    int root;
    String key, name;
    String i ="";
    root = reg.getKeyRoot(System.getProperty("os.name"));
    key = reg.getKeyPath(System.getProperty("os.name"));
    name = reg.getKeyNameName(System.getProperty("os.name"));
    try {
        if (getOS().equals("Windows 95")) {
            i = getRegKeyValueWin95(root, key, name);
        }
        else {
            i = getRegKeyValueWin(root, key, name);
        }
        // If key not found, then return null
        if (i.length() == 0)
            return null;
        // If result is length 0, then set to ""
        if (i.equals(""))
            i = "";
    } catch (UnsatisfiedLinkError e) {
    }
    if (reg.getType() == RegistryObject.REGISTRY_STRING)
        return i;
    return (new Integer(i));
}
/**
 * Set the value of a registry key
 * Note: If the key does not already exist, a new one is created
 *
 * @param reg the registry object
 * @return boolean indicating the success of the procedure
 */
public boolean setRegKeyValue(RegistryObject reg) {
    int root;
    String key, name, value;
    boolean i = false;
    root = reg.getKeyRoot(System.getProperty("os.name"));
    key = reg.getKeyPath(System.getProperty("os.name"));
    name = reg.getKeyNameName(System.getProperty("os.name"));
    // need to handle string & ints
    value = (String)reg.getKeyValue(System.getProperty("os.name"));
    try {
        if (getOS().equals("Windows 95"))
            i = setRegKeyValueWin95(root, key, name, value);
        else
            i = setRegKeyValueWin(root, key, name, value);
    } catch (UnsatisfiedLinkError e) {
    }
    return i;
}
/**
 * Delete a registry key or value
 *
 * @param reg the registry object
 * @return boolean indicating the success of the procedure
 */
public boolean deleteRegKey(RegistryObject reg) {
    int root;
    String key, name;
    boolean i = false;
    root = reg.getKeyRoot(System.getProperty("os.name"));
    key = reg.getKeyPath(System.getProperty("os.name"));
    name = reg.getKeyNameName(System.getProperty("os.name"));
    try {
        if (getOS().equals("Windows 95"))
            i = deleteRegKeyValueWin95(root, key, name);
        else
            i = deleteRegKeyValueWin95(root, key, name);
        if (i == false) {
            if (getOS().equals("Windows 95"))
                i = deleteRegKeyWin95(root, key, name);
            else
                i = deleteRegKeyWin(root, key, name);
        }
    } catch (UnsatisfiedLinkError e) {
    }
    return i;
```

-continued

```
}
/**
 * Enumerate registry keys and value names
 *
 * @ param reg the registry object
 * @ return vector containing the list of registry keys and value
 * names or null if key not found
 */
public Vector getRegKeyEnumerate(RegistryObject reg) {
    Vector v = new Vector();
    String i = "";
    int root;
    String key;
    root = reg.getKeyRoot(System.getProperty("os.name"));
    key = reg.getKeyName(System.getProperty("os.name"));
    try {
        if (getOS().equals("Windows 95"))
            i = getRegKeyEnumerateWin95(root, key);
        else
            i = getRegKeyEnumerateWin(root, key);
        // If key is not found, then return null
        if (i.length() == 0)
            return null;
        // Convert the tokenized string to a vector
        String c = "";
        java.util.StringTokenizer st = new java.util.StringTokenizer(i, "");
        while (st.hasMoreTokens()) {
            c = st.nextToken();
            v.addElement( c );
        }
    } catch (UnsatisfiedLinkError e) {
        return null;
    }
    return v;
}
```

The following native Windows code is called by Java (CPPWIN32.java):
The method getRegKeyValueWin95(int root, jstring key, jstring name) uses:
RegOpenKeyEx
RegQueryValueEx
ExpandEnvironmentStrings
RegCloseKey
The method setRegKeyValueWin95(int root, jstring key, jstring name, jstring value) uses:
RegCreateKeyEx
RegSetValueEx
RegCloseKey
The method deleteRegKeyWin95(int root, jstring key, jstring name) uses:
RegOpenKeyEx
RegQueryInfoKey
RegDeleteKey
RegCloseKey
The method deleteRegKeyValueWin95(int root, jstring key, jstring name) uses:
RegOpenKeyEx
RegDeleteValue
RegCloseKey
The method getRegKeyEnumerateWin95(int root, jstring key) uses:
RegOpenKeyEx
RegEnumKey
RegEnumValue
RegCloseKey For the registry equivalent function in the OS/2 operating system as shown in FIG. 4, there is no key, subkey, value. Other preferred embodiments will describe more specifically how the global registry object is used in the context of an OS/2 operating system.

In general, the global registry object works across different operating systems. The global registry object provides a mapping to the different operating systems. As such, providing a registry equivalent function using a global registry object enables registry functions to be carried out more simply than the way in which the are carried out in the Windows operating system environment, even though it is very comparable, in general, to what is being carried out in Windows. The global registry object structure follows more closely with a filesystem structure than with the registry calls from Windows 32.

The code structure shown in FIG. 7 is capable of running on any operating system. An understanding of the function of the global registry object is made evident by an understanding of a Windows registry and how it is set up as described above. An understanding of how the global registry object is applicable to operating system environments that do not have a registry is made evident in other embodiments that specifically address these other operating system environments such as OS/2 and AIX which are described further below.

Figure 8:
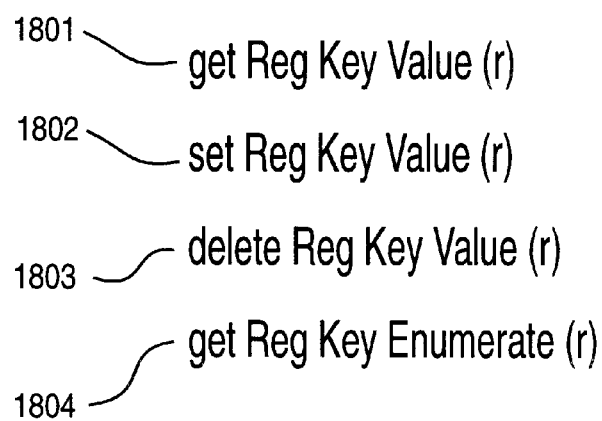
FIG. 8 illustrates the four calls that are used in a platform specific module to enable registry functions such as read, create, modify, delete, and enumerate registries.

Within a preferred embodiment, there is a global registry object defined according to FIG. 7. In addition, there are functions and interfaces within the operating system specific code modules (CPP) that enable the global registry object to appear as if it is platform independent. In each platform specific module, CPP, 201, FIG. 2, an interface is defined for each of the four global registry object methods 1702, 1704, 1706, 1708, FIG. 7, that allows a user to get to and manipulate registries. As shown in FIG. 8, the following calls, which take a registry object "r", are made a part of the platform specific modules: a "get registry key value" 1801; "a set registry key value" 1802; a "delete registry key value" 1803; and a "get registry key enumerate" on a particular subkey. This simplifies the twenty or so different registry calls within Windows to just four calls which enables the registry functions; and makes the four calls platform independent so that they have meaning to each platform as well.

In a third preferred embodiment, the global registry object enables the OS/2 INI files to resemble a registry. It should be noted that a registry is stored in one place; and there is one registry for a given system. However, for OS/2 there are multiple INI files 1401, FIG. 4. Therefore, to have an equivalent registry function, one of the INI files are kept as a registry file called "jitk.ini" which keeps all of the registry items or equivalents thereto of a Windows registry as shown in FIG. 3. For mapping, "application name" is handled by "set key name" 1704, FIG. 7 up to the last slash, i.e., "key3\subkey3" as shown in FIG. 7 becomes the application name 1402, FIG. 4 on OS/2. Likewise, "value" in the argument 1717, FIG. 7 becomes the key 1403, FIG. 4 on OS/2. In a set value 1708, FIG. 7, the value 1709 becomes the value 1404 that the key 1403, FIG. 4 is set to. Consequently, an application name for OS/2 contains all of the keys and subkeys of 1705 that represent a registry structure such as in Windows. As such the keys and subkeys representing a registry are stored in the application name of an OS/2 INI file. Then, within the platform dependent CPP module, the call "get Reg Key Value" 1801, FIG. 8 undertakes the following. The value 1404 of the key 1403 is set as specified at 1709, e.g., "myData", in the "setValue" method 1708 of the registry object 1701. Therefore, the "get Reg Key Value" 1801 looks up the application name 1402 and the key 1403 in the INI file 1401 and retrieves and returns them. The "set Reg Key Value" call in the platform specific code will store the first part of the key name 1705 up to the last slash into the application name of an INI file; and will store the value 1709 from the registry object into the value 1404 for the key 1403 of the INI file. A "delete Reg Key Value" will delete the application name and key value entries from the INI file. Enumeration, i.e., "get Reg Key Enumerate", means that given a key 3, 1313, FIG. 3, everything directly underneath that key, similar to a directory in a filesystem, will be returned. For Windows, the enumeration is straightforward. For OS/2 which utilizes an application name in an INI file, the enumeration is not so straightforward.

For example, there may be several applications with keys underneath each application name. For an application name "key3\subkey3", the enumeration for this subkey3 is straightforward for the keys underneath which equate to the values 1709 set at 1708, FIG. 7 because they are all listed and maintained that way. Another application may have the name "key3\subkey3\subsub1". The problem is that the second application contains the etring of the application name. Therefore, enumeration now has to take into account the fact that this is a separate application more than one deep, contained under subkey3. To obtain the enumeration of key3 with method "get Reg Key Emumerate", it should return not only every value under the key field of key3, but also every subkey (subkey1 through subkey N) as well.

It should be noted that for the OS/2 operating system, the INI files are scattered throughout the system. For example, there may be an OS/2 INI file that performs OS/2 specific functions, and a user INI file for other functions.Likewise, most application products have their own INI files. The global registry object can be used to read any of those files as well by knowing that the application name being accessed is found at 1705 in the "set key name" method of the global registry object; and the value that the user is looking for is the key name. The name of the file that the user is looking for has to be identified in the filename field 1601, FIG. 6, of the global registry object. For OS/2, if the filename is not specified, the global registry object goes to the one that has been defined as the default registry. However, the user can define a filename as the default registry. For example, if the user has a product name "Hello", then there is a "hello.INI" file in the system. The user can direct the global registry object to use the "hello.INI" by specifying this name in filename field 1601 of the global registry object The "r.getvalue" method within the global registry object can then be called on some field in "hello.INI". The method will go through and extract the value out and return that information. As such, the global registry object is not only capable of performing registry equivalent functions, but it is also capable of transforming or using INI files into a registry and for reading information from it.

```
Registry for OS/2
---- from CPPOS2.java
/**
 * Get the value of a registry key
 *
 * @ param reg the registry object
 * @ return string containing the value of the registry key
 */
public Object getRegKeyValue(RegistryObject reg) {
        int root;
        String name, fileName, appName;
        String i = "";
        name = reg.getKeyNameName(System.getProperty("os.name"));
        fileName = reg.getFile(System.getProperty("os.name"));
        appName = reg.getKeyPath(System.getProperty("os.name"));
        if ((fileName == null) || (fileName.length() == 0))
            fileName = getIniFile();
        try {
            if (reg.getType() == RegistryObject.REGISTRY_STRING)
                i = getRegKeyValueOS2(fileName, appName, name, 0);
            else
                i = getRegKeyValueOS2(fileName, appName, name, 1);
        } catch (UnsatisfiedLinkError e) {
        }
```

```
            if (i.equals("%NULL%ERROR%"))
                return null;
            if (reg.getType() == RegistryObject. REGISTRY_STRING)
                return i;
            if (i.length() == 0)
                return null;
            return (new Integer(i));
    }
    /**
    * Set the value of a registry key
    * Note: if the key does not already exist, a new one is created
    *
    * @ param reg the registry object
    * @ return boolean indicating the success of the procedure
    */
    public boolean setRegKeyValue(RegistryObject reg) {
        String name, fileName, appName;
        Object value;
        boolean i = false;
        name = reg.getKeyNameName(System.getProperty("os.name"));
        fileName = reg.getFile(System.getProperty("os.name"));
        appName = reg.getKeyPath(System.getProperty("os.name"));
        value = reg.getKeyValue(System.getProperty("os.name"));
        if ((fileName == null) || (fileName.length() == 0))
            fileName = getIniFile();
        try {
            if (value instanceof java.lang.String) {
                if (setRegKeyValueStringOS2(fileName, appName, name, (String)value) == 1)
                    i = true;
            }
            else if (value instanceof java.lang.Integer) {
                if (setRegKeyValueIntoS2(fileName, appName, name, ((Integer)value).intValue())
== 1)
                    i = true;
            }
            else {
                System.out.println("ERROR: value is instance of");
            }
        } catch (UnsatisfiedLinkError e) {
            return i;
        }
    }
    /**
    * Delete a registry key or value
    *
    * @ param reg the registry object
    * @ return boolean indicating the success of the procedure
    */
    public boolean deleteRegKey(RegistryObject reg) {
        String name, fileName, appName;
        boolean i = false;
        name = reg.getKeyNameName(System.getProperty("os.name"));
        fileName = reg.getFile(System.getProperty("os.name"));
        appName = reg.getKeyPath(System.getProperty("os.name"));
        if ((fileName == null) || (fileName.length() == 0))
            fileName = getIniFile();
        try {
            if (deleteRegKeyOS2(fileName, appName, name) == 1) {
                i = true;
            }
        } catch (UnsatisfiedLinkError e) {
        }
        return i;
    }
    /**
    * Enumerate registry keys
    *
    * @ param reg the registy object
    * @ return Vector of strings containing the list of registry keys
    */
    public java.util.Vector getRegKeyEnumerate(RegistyObject reg) {
    Vector v = new Vector();
    String i = "";
    String fileName, appName;
    fileName = reg.getFile(System.getProperty("os.name"));
    appName = reg.getKeyName(System.getProperty("os.name"));
    if ((fileName == null) || (fileName.length() == 0))
            fileName = getIniFile();
        try {
            i = getRegKeyEnumerateOS2(fileName, appName);
```

-continued

```
            // Convert the tokenized string to a vector
            String c = "";
            java.util.StringTokenizer st = new java.util.StringTokenizer(i.substring(1), "");
            while (st.hasMoreTokens()) {
                c = st.nextToken();
                if (c.length() > 0)
                    v.addElement( c );
            }
        } catch (UnsatisfiedLinkError e) {
        }
        return v;
    }
    * Get the default ini file. This is the USER_INI environment variable
    * path + jitk.ini. The registry equivalent info is stored in this
    * file by the install program.
    *
    * @ return String set to USER_INI path + jitk.ini. This is usually
    * "c:\os2\jitk.ini"
    */
    private String getIniFile() {
        String userIni = getEnvironmentVariable("USER_INI");
        int pos = Math.max(userIni.lastIndexOf('\\'), userIni.lastIndexOf('/'));
        it (pos > -1)
            userIni = userIni.substring(0, pos);
        return userIni+File.separator+"jitk.ini";
    }
            The following native OS/2 code is called by Java (CPPOS2.java):
The following method getRegKeyValueOS2(jstring fileName, jstring appName, jstring name,
jint intType) uses the following OS/2 APIs:
PrfOpenProfile
PrfQueryProfileData
PrfQueryProfileData
PrfCloseProfile
The method setRegKeyValueStringOS2(jstring fileName, jstring appName, jstring name,
jstring value) uses:
PrfOpenProfile
PrfWriteProfileString
PrfCloseProfile
The method setRegKeyValueIntOS2(jstring fileName, jstring appName, jstring name, jint
value) uses:
PrfOpenProfile
PrfWriteProfileData
PrfCloseProfile
The method deleteRegKeyOS2(jstring fileName, jstring appName, jstring name) uses:
PrfOpenProfile
PrfWriteProfileData
PrfCloseProfile
The method getRegKeyEnumerateOS2(jstring fileName, jstring appName) uses:
PrfOpenProfile
PrfQueryProfileSize
PrfQueryProfileData
PrfCloseProfile
```

Figure 5:
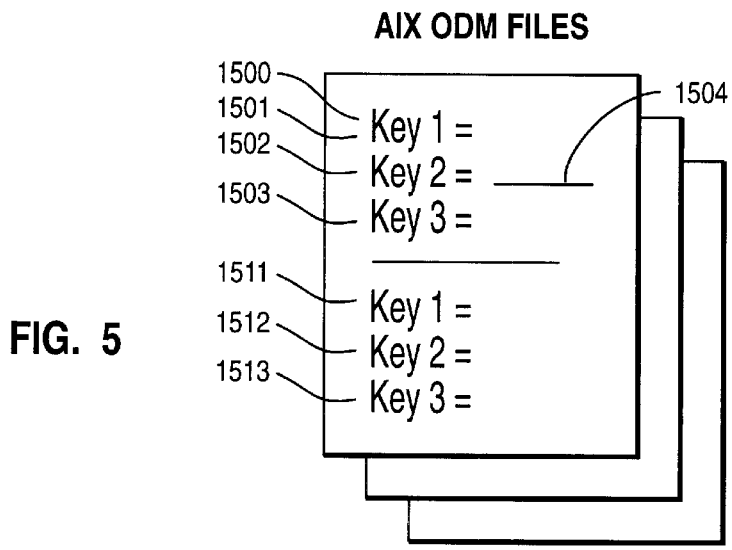
FIG. 5 illustrates the structure of ODM files of the AIX operating system.

In another preferred embodiment, the global registry object provides a mapping to the ODM files, FIG. 5, of the AIX operating system to provide registry equivalent functionality to an operating system that does not have a registry. The implementation provides a bridge between the AIX implementation and the global registry object. For example, key1, 1501, FIG. 5, can be equal to the application name 1402, FIG. 4, as set in the "set key name" method 1704 of the global registry object and key2 can be equal to the value 1717. Whatever the key2 1502 is equal to is set by the variable 1709 in the "set value" method 1708 of the global registry object. As shown, the mapping for AIX as illustrated in the figures would be as follows:

key1 1501, FIG. 5 →key3\subkey3 FIG. 7 key2 1502, FIG. 5 →value 1717, FIG. 7 key3 1503, FIG. 5 →"myData" 1709, FIG. 7

The above is contained within a specific ODM file, e.g., jitk, that represents the particular ODM file. As with the INI files on OS/2, the global registry object can read information from an ODM file. In addition to the default ODM file, there are many other ODM files in the system. The global registry object can look for any of those files and to look for values or keys within any of those files.

Furthermore, in another preferred embodiment, a system independent registry is created for those systems that do not have a registry equivalent, i.e., a registry independent operating system. For example, AIX could be considered has having a registry equivalent or not. Although the description above illustrated a mapping to an ODM file for registry purposes, the difficulty in defining the keys within an ODM file may have frustrated any such purpose for using an ODM file as an equivalent registry. Other systems, such as Linux, Solaris, and other UNIX based systems do not have registries.

A new system independent registry object, referred to as a registry DB object, contains the four methods 1801, 1802, 1803, and 1804 of FIG. 8. The registry DB object uses either a database or a file system to save off the registry information from the methods and to look similar to a Windows registry.

```
System-independent registry
---- from CPPLIN.Java
    /**
     * Get the value of a registry key
     *
     * @ param reg the registry object
     * @ return string containing the value of the registry key
     */
    public Object getRegKeyValue(RegistryObject reg) {
        RegistryDB db = new RegistryDB();
        return db.getRegKeyValue(reg);
    }
    /**
     * Set the value of a registry key
     * Note: If the key does not already exist, a new one is created
     *
     * @ param reg the registry object
     * @ return boolean indicating the success of the procedure
     */
    public boolean setRegKeyValue(RegistryObject reg) {
        RegistryDB db = new RegistryDB();
        return db.setRegKeyValue(reg);
    }
    /**
     * Delete a registry key or value
     *
     * @ param reg the registry object
     * @ return boolean indicating the success of the procedure
     */
    public boolean deleteRegKey(RegistryObject reg) {
        RegistryDB db = new RegistryDB();
        return db.deleteRegKey(reg);
    }
    /**
     * Enumerate registry keys
     *
     * @ param reg the registry object
     * @ return string containing the value of the environment variable
     */
    public java.util.Vector getRegKeyEnumerate(RegistryObject reg) {
        RegistryDB db = new RegistryDB();
        return db.getRegKeyEnumerate(reg);
    }
```

Class RegistryDB

METHOD INDEX deleteRegKey(RegistryObject)
    Delete a registry key or value
getDBFile( )
    Get the default registry file.
getRegKeyEnumerate(RegistryObject)
    Enumerate registry keys
getRegKeyValue(RegistryObject)
    Get the value of a registry key
setRegKeyValue(RegistryObject)
    Set the value of a registry key Note: If the key does not already exist, a new one is created Copyright IBM Corporation 1998

The present invention has been describe above in the context of a fully functional system, method, and computer program; all of which are capable of being contained within one or more physical devices. The program of this invention is capable of being made, used, sold and distributed in the form of a computer usable medium of instructions in a variety of forms. The present invention applies equally regardless of the particular type of signal bearing media actually used. Examples of computer usable media include volatile memory (e.g., RAM, DRAM, SRAM); nonvolatile memory such as read only memories (ROMS) or erasable, electrically programmable, read only memories (EPROMs), or recordable type media such as floppy disks, hard disks and CD-ROMs; and transmission type media such as digital and analog communication links.

While the invention has been particularly shown and described with reference to a preferred embodiment, it will be understood by those skilled in the art that various changes in form and detail may be made therein without departing from the spirit and scope of the invention.

I claim:

1. A computer system, running an OS/2 operating system, comprising a global registry object for mapping to a plurality of different system registries;

means for specifying through a filename field of the global registry object, one of a plurality of INI files of the OS/2 operating system to resemble a registry file;

means for storing in an application name of the specified INI file at least a part of a key name from the global registry object having a key and a subkey representative of a Windows registry; and means for storing in a key of the specified INI file a value, from the global registry object, representative of the Windows registry.

2. The computer system of claim 1 further comprising platform specific code specific to the OS/2 operating system having methods for retrieving the application name and the key from the INI file for use by the global registry object.

3. The computer system of claim 1 further comprising means for using the global registry object to perform at least one of read, write, enumerate and delete information from any INI file.

4. A computer implemented method comprising:

specifying one of a plurality of INI files of the OS/2 operating system as a registry file;

storing in an application name of the specified INI file at least a part of a key name from a global registry object having a key and a subkey representative of a Windows registry, wherein the global registry object is able to be mapped to a plurality of different system registries;

storing in a key of the specified INI file a value, from the global registry object, representative of the Windows registry; and retrieving the application name and the key from the specified INI file as registry information.

5. A tool kit program, on a computer usable medium, comprising:

means for enabling a creation of an install program;

means for utilizing, by the created install program, a global registry object able to be mapped to a plurality of different system registries;

means for specifying, through a filename field of the global registry object, one of a plurality of INI files of the OS/2 operating system to resemble a registry file;

means for storing in an application name of the specified INI file at least a part of a key name from the global registry object having a key and a subkey representative of a Windows registry;

means for storing in a key of the specified INI file a value, from the global registry object, representative of the Windows registry, and means for enabling the install program to read, create, modify, delete, and enumerate registry information through INI files for the OS/2 operating system by utilizing the global registry object.

* * * * *